United States Patent
Abramyanc

(10) Patent No.: US 12,079,924 B2
(45) Date of Patent: Sep. 3, 2024

(54) SYSTEM AND METHOD FOR DYNAMIC IMAGES VIRTUALIZATION

(71) Applicant: Snap Inc., Santa Monica, CA (US)

(72) Inventor: Karen Abramyanc, Bat Yam (IL)

(73) Assignee: SNAP INC., Santa Monica, CA (US)

( * ) Notice: Subject to any disclaimer, the term of this patent is extended or adjusted under 35 U.S.C. 154(b) by 0 days.

(21) Appl. No.: 17/788,985

(22) PCT Filed: Dec. 21, 2020

(86) PCT No.: PCT/IL2020/051317
§ 371 (c)(1),
(2) Date: Jun. 24, 2022

(87) PCT Pub. No.: WO2021/137209
PCT Pub. Date: Jul. 8, 2021

(65) Prior Publication Data
US 2023/0022344 A1    Jan. 26, 2023

(30) Foreign Application Priority Data
Dec. 31, 2019  (IL) .......................................... 271774

(51) Int. Cl.
*G06T 15/20*     (2011.01)
*G06T 3/4053*    (2024.01)
(Continued)

(52) U.S. Cl.
CPC .......... *G06T 15/205* (2013.01); *G06T 3/4053* (2013.01); *G06T 5/50* (2013.01);
(Continued)

(58) Field of Classification Search
CPC ..................... G06T 15/205; G06T 5/50; G06T 2207/20021
See application file for complete search history.

(56) References Cited

U.S. PATENT DOCUMENTS

| 9,595,083 B1 | 3/2017 | Smith |
| 2003/0051255 A1 | 3/2003 | Bulman |

(Continued)

FOREIGN PATENT DOCUMENTS

| CN | 115004701 | 9/2022 |
| EP | 3540696 A1 | 9/2019 |

(Continued)

OTHER PUBLICATIONS

"International Application Serial No. PCT/IL2020/051317, International Search Report mailed Mar. 22, 2021", 11 pgs.

(Continued)

*Primary Examiner* — Samantha (Yuehan) Wang
(74) *Attorney, Agent, or Firm* — SCHWEGMAN LUNDBERG WOESSNER, P.A.

(57) ABSTRACT

A dynamic image virtualization system and method configured to utilize an AI model in order to conduct a reduced latency real-time prediction process upon at least one input image, wherein said prediction process is designated to create free-viewpoint 3D extrapolated output dynamic images tailored in advance to the preferences or needs of a user and comprising more visual data than the at least one input image.

20 Claims, 4 Drawing Sheets

(51) Int. Cl.
G06T 5/50 (2006.01)
G06T 5/77 (2024.01)
G06T 9/00 (2006.01)

(52) U.S. Cl.
CPC .............. *G06T 5/77* (2024.01); *G06T 9/00* (2013.01); *G06T 2207/20021* (2013.01); *G06T 2207/20081* (2013.01); *G06T 2207/20084* (2013.01)

(56) References Cited

U.S. PATENT DOCUMENTS

| | | | |
|---|---|---|---|
| 2006/0061584 | A1 | 3/2006 | Kristiansen |
| 2008/0043096 | A1* | 2/2008 | Vetro ............... H04N 13/128 348/E13.067 |
| 2009/0147854 | A1 | 6/2009 | Dane |
| 2016/0371884 | A1* | 12/2016 | Benko ............... H04N 23/80 |
| 2016/0379333 | A1* | 12/2016 | Krutsch ............. G06T 15/04 345/506 |
| 2017/0041585 | A1 | 2/2017 | Liu |
| 2017/0148222 | A1* | 5/2017 | Holzer .............. H04N 23/698 |
| 2017/0287098 | A1* | 10/2017 | Strugar ............. G06T 15/80 |
| 2019/0043253 | A1* | 2/2019 | Lucas ............... G06T 15/10 |
| 2019/0066257 | A1 | 2/2019 | Daga |
| 2022/0230327 | A1* | 7/2022 | Croxford ............ G06T 1/20 |

FOREIGN PATENT DOCUMENTS

| | | | |
|---|---|---|---|
| WO | 2016114930 | 7/2016 | |
| WO | WO-2016114930 A2 * | 7/2016 | ............. G06T 17/10 |
| WO | 2018064287 A1 | 4/2018 | |
| WO | 2018140229 A1 | 8/2018 | |
| WO | 2021137209 | 7/2021 | |

OTHER PUBLICATIONS

"International Application Serial No. PCT/IL2020/051317, Written Opinion mailed Mar. 22, 2021", 4 pgs.
"International Application Serial No. PCT/IL2020/051317, International Preliminary Report on Patentability mailed Jul. 14, 2022", 6 pgs.
"European Application Serial No. 20908671.9, Indication of deficiencies in a request under Rule 22 EPC mailed Oct. 25, 2022", 3 pgs.
Vu T., Nguyen C.V., Pham T.X., Luu T.M., Yoo C.D. , "Fast and Efficient Image Quality Enhancement via Desubpixel Convolutional Neural Networks", In: Leal-Taixe L., Roth S. (eds) Computer Vision—ECCV 2018 Workshops. ECCV 2018. Lecture Notes in Computer Science, vol. 11133. Springer, Cham. Aug. 19, 2019. Available at the following URL: <https://web.archive.org/web/20190819034433/http://openaccess.thecvf.com/content_ECCVW_2018/papers/11133/Vu_Fast_and_Efficient_Image_Quality_Enhancement_via_Desubpixel_Convolutional_Neural_ECCVW_2018_paper.pdf> Aug. 19, 2019 (Aug. 19, 2019).
Wikipedia contributors, 'Tiled rendering', Wikipedia, The Free Encyclopedia, Sep. 28, 2019, 14:20 UTC, <https://en.wikipedia.org/w/index.php?title=Tiled_rendering&oldid=918407286> [accessed Feb. 21, 2021] Wikipedia contributors Sep. 28, 2019 (Sep. 28, 2019).
"European Application Serial No. 20908671.9, Response to Communication pursuant to Rules 161 and 162 filed Jan. 13, 2023", 9 pgs.
"European Application Serial No. 20908671.9, Extended European Search Report mailed Dec. 12, 2023", 9 pgs.
Ching-Ling, Fan, "Fixation Prediction for 360 Video Streaming in Head-Mounted Virtual Reality", Proceedings of the 27th Workshop on Network and Operating Systems Support for Digital Audio and Video, Nossdav 17 New York, New York, USA, (Jan. 1, 2017), 7 pgs.

* cited by examiner

SYSTEM AND METHOD FOR DYNAMIC IMAGES VIRTUALIZATION

CLAIM OF PRIORITY

This application is a U.S. national-phase application filed under 35 U.S.C. § 371 from International Application Serial No. PCT/IL2020/051317, filed on Dec. 21, 2020, and published as WO 2021/137209 on Jul. 8, 2021, which claims the benefit of priority to Israel Application Serial No. 271774, filed on Dec. 31, 2019, each of which are incorporated herein by reference in their entireties.

FIELD OF THE INVENTION

The present invention relates to image virtualization systems in general and in particular to a low-latency image virtualization system used to produce dynamic images and comprising a prediction ability.

BACKGROUND OF THE INVENTION

Images virtualization systems may be used for many purposes, for example, they may be used to visualize objects or surroundings from different perspectives or to provide an immersive sensation enabling a user to explore environments or objects of interest. In order to achieve these abilities, a visualization system preferably needs to provide a constant operation with a minimal latency while preferably using minimal computational requirements and resources. For example, a virtualization system that is configured to provide an immersive experience, for example, by using augmented reality (AR) or mixed reality (MR), is required to provide real-time monitoring of a user's bearings with minimum response delay. These abilities are hard to reach in an uncontrolled network environment.

Known virtualization systems are challenged by limited computational resources and as a result, the visual quality of the 3D content displayed to a user of such a system is relatively poor comparing to the quality of feature films or computer games.

One reason for the above-mentioned difficulties is the fact that image files may be very large and can typically span from several megabytes to several gigabytes in size and as a result, may be impractical to distribute over a network with limited bandwidth. Even when there is no real-time requirement, the time used for transferring image files may be too long to be of a practical use.

Several approaches disclosed in prior art Publications and the drawbacks they pose are disclosed below:

Images cloud rendering—Cloud rendering may pose various drawbacks. One such drawback relates to the fact that attempts to offload rendering resources into cloud computing systems turned out to be sensitive to latency resulting from disruptions in network communication. The fact that costs associated with cloud computing grow linearly with increase in the number of customers consuming its content, makes the use of such systems challenging from a business model perspective.

Procedural real-time rendering on customer device—Such an approach may be limited in its visual quality results due to limited local computing resources and may also require a long start-up time which has the potential to increase latency and affect a desired real-time operation.

Point cloud streaming—This technology can only stream low visual quality images due to the fact that it supports Lambertian surfaces only. The scalability of this technology may be limited where large complex volumetric topology is involved.

As previously mentioned, several Publications disclose image virtualization systems. For example, Publication US 2006/0061584 A1 discloses a method, system and device for distributing in real time data related to three-dimensional computer modeled images scenes over a network. Said publication discloses the use of mipmap textures technology in order to reduce images size and efficiently render the data over the network.

Publication US 2006/0061584 A1 does not disclose applying a prediction process resulted in creating extrapolated output dynamic images that comprises more visual data than the input image/s. Moreover, Publication US 2006/0061584 A1 does not disclose a prediction process that creates the further visual data by using an AI model of any sort. The use of AI in the current application enables a prediction process that provides a reduced latency real-time prediction and, in turn, enables the creation of extrapolated output dynamic images tailored in advance to the preferences or needs of a user.

SUMMARY OF THE INVENTION

The present invention provides a dynamic images virtualization system that comprises low-latency virtualization abilities and can be used to produce and display enhanced-quality dynamic images comprising broadened visual data by using AI models.

The present invention uses AI models to conduct a low-latency prediction process in real-time while requiring relatively low computing resources.

The invention is further implemented by using AI in order to enhance the image quality of said extrapolated output dynamic images, hence providing an efficient rendering technique to compress and decode visual data while displaying real-time stream of high-quality images to a user.

The present invention suggests using a virtualization system to create extrapolated real-time output dynamic images tailored in advance to the preferences or needs of a user while requiring a modest amount of computing resources.

The following embodiments and aspects thereof are described and illustrated in conjunction with systems, devices and methods which are meant to be exemplary and illustrative, not limiting in scope. In various embodiments, one or more of the above-described problems have been reduced or eliminated, while other embodiments are directed to other advantages or improvements.

According to one aspect, there is provided a dynamic images virtualization system, comprising a controller configured to perform digital image processing upon at least one input image and produce extrapolated output dynamic images and at least one display means configured to present said extrapolated output dynamic images to at least one user.

According to some embodiments, said digital image processing comprises a reduced-latency prediction process that results in extrapolated output dynamic images comprising more visual data than the at least one input image.

According to some embodiments, at least one input image is subdivided into multiple image tiles.

According to some embodiments, an AI model is trained to perform a data fetching prediction in order to conduct the reduced-latency prediction process that produces the extrapolated output dynamic images.

According to some embodiments, the reduced-latency prediction process is conducted using a content-delivery-network (CDN).

According to some embodiments, the reduced latency prediction process is configured to produce extrapolated output dynamic images by calculating and suggesting subsequent future tiles that are based on the at least one input image and comprise further visual data than the at least one input image.

According to some embodiments, each tile includes an array of visual data that may be compressed.

According to some embodiments, each tile is a multi-resolution tile, a multi-view compressed tile or temporally compressed tile.

According to some embodiments, each tile is combined with at least one other tile to create a larger tile comprising the visual data of said combined tiles.

According to some embodiments, the extrapolated output dynamic images comprise an unlimited stack of overlay layers and resolution pyramids.

According to some embodiments, the extrapolated output dynamic images provide an input to an AI model that was trained to conduct image quality enhancement using DNN.

According to some embodiments, the image quality enhancement using SP technique.

According to some embodiments, the digital image processing performs streaming of object-centric volumetric content presented to the at least one user using the at least one display means.

According to some embodiments, the digital image processing performs streaming of view-centric volumetric content presented to the at least one user using the at least one display means.

According to some embodiments, the extrapolated output dynamic images are presented using unstructured light-field technology.

According to some embodiments, wherein the extrapolated output dynamic images are presented using billboard based quad rendering.

According to some embodiments, wherein the at least one input image is created and then displayed as extrapolated output dynamic images by using a view-dependent reconstruction of a virtual camera.

According to some embodiments, the at least one input image is captured using a hardware camera.

According to some embodiments, the at least one input image is created using computer generated imagery.

According to some embodiments, the at least one input image is a 2D image and the extrapolated output dynamic images are 3D images.

According to some embodiments, the extrapolated output dynamic images display a virtualized architectural space or structure.

According to some embodiments, the extrapolated output dynamic images display at least one virtualized visual effect.

According to some embodiments, the bearings of the at least one user are captured by at least one sensor and relayed to and analyzed by the controller.

According to some embodiments, the digital image processing uses multiple layers of caching.

According to some embodiments, the extrapolated output dynamic images can be relayed using a wireless network or a wired network.

According to some embodiments, the extrapolated output dynamic images are conveyed using remote streaming.

According to some embodiments, the at least one display means is a mobile cellular device or a head-mounted display (HMD).

According to some embodiments, wherein the processed input images are protected using authentication or verification algorithms.

According to a second aspect, there is provided a method for using a dynamic images virtualization system comprising the steps of capturing or creating at least one input image, applying compression upon the at least one input image, hence relatively reducing the size of each image tile, creating a data-set and its associated metadata, applying reduced-latency prediction based on the created data-set, applying decompression by restoring compressed image tiles and extracting encrypted data, creating extrapolated output dynamic images and presenting the extrapolated output dynamic images to a user.

According to some embodiments, the reduced latency prediction process is configured to produce extrapolated output dynamic images by calculating and suggesting subsequent future tiles that are based on the at least one input image and comprise further visual data than the at least one input image.

According to some embodiments, data regarding the bearings of the user is acquired and used during the dynamic image virtualization method.

According to some embodiments, Artificial intelligence (AI) techniques are used to process and analyze the captured input images.

According to some embodiments, compressed image tiles are distributed using content delivery network (CDN).

According to some embodiments, deep neural network (DNN) is applied in order to execute a fetching reduced-latency prediction process.

According to some embodiments, wherein a controlled access on demand process is used to regulate the rendering of image tiles undergoing fetching reduced-latency prediction process.

According to some embodiments, 3D images created after decompression of image tiles are converted into 2D extrapolated output dynamic images.

According to some embodiments, the extrapolated output dynamic images undergo quality enhancement processes performed by artificial intelligence (AI) trained model.

According to some embodiments, the extrapolated output dynamic images undergo image repair techniques in order to repair possible image defects.

According to a third aspect, there is provided a method for data processing using a dynamic images virtualization system comprising the steps of parsing metadata containing an array of statically defined data-structures, initializing the visual scene and camera, gathering data in order to present a user with tiles that represent the current position of the camera, extracting current and future subsequent probable tiles to be fetched and ultimately used for constructing extrapolated output dynamic images, updating texture atlases in accordance with extracted data, constructing extrapolated output dynamic images, applying image refinement techniques in order to improve the extrapolated output dynamic images presented to the user, predicting future positions of the camera using prediction techniques and gathering future tiles data based on future positions of the camera.

According to some embodiments, input images can be restored by creating extrapolated output images comprising unlimited stack of overlay layers and resolution pyramids.

According to some embodiments, each image tile comprises low frequency data.

According to some embodiments, each image tile is compressed using temporal compression.

According to some embodiments, input images are compressed using multi view compression.

According to a fourth aspect, there is provided a method for data compression using a dynamic images virtualization system comprising the steps of capturing or creating at least one input image, subdividing each captured input image into image tiles and applying compression techniques, hence relatively reducing the size of each image tile.

BRIEF DESCRIPTION OF THE FIGURES

Some embodiments of the invention are described herein with reference to the accompanying figures. The description, together with the figures, makes apparent to a person having ordinary skill in the art how some embodiments may be practiced. The figures are for the purpose of illustrative description and no attempt is made to show structural details of an embodiment in more detail than is necessary for a fundamental understanding of the invention. For the sake of clarity, some objects depicted in the figures are not to scale.

In the Figures.

DETAILED DESCRIPTION OF SOME EMBODIMENTS

Figure 1:
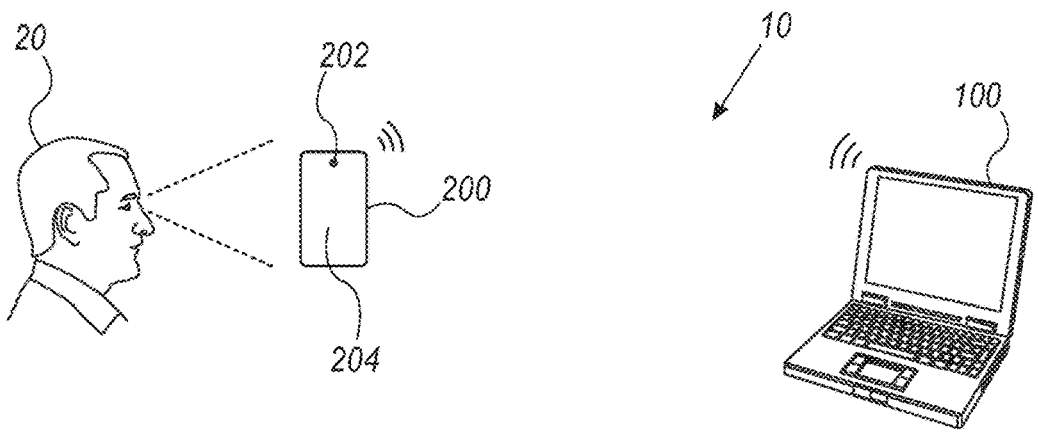
FIG. 1 constitutes a schematic perspective view of a dynamic images virtualization system, according to some embodiments of the invention.

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", "setting", "receiving", or the like, may refer to operation(s) and/or process(es) of a controller, a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Unless explicitly stated, the method embodiments described herein are not constrained to a particular order or sequence. Additionally, some of the described method embodiments or elements thereof can occur or be performed simultaneously, at the same point in time, or concurrently.

The term "Controller", as used herein, refers to any type of computing platform that may be provisioned with a memory device, a Central Processing Unit (CPU) or microprocessors, and several input/output (I/O) ports, for example, a general-purpose computer such as a personal computer, laptop, tablet, mobile cellular phone or a cloud computing system.

The term "Artificial Intelligence" or "AI", as used herein, refers to any computer model that can mimic cognitive functions such as learning and problem-solving. AI can further include specific fields such as artificial neural networks (ANN) and deep neural networks (DNN) that are inspired by biological neural networks.

The term "Content-Delivery-Network" or "CDN", as used herein, refers to a geographically distributed network of servers and their data centers wherein said distribution provides caching layer with low latency data access.

The term "Unstructured Light Fields", as used herein, refers to a faithful reproduction of 3D scenes by densely sampling light rays from multiple directions in an unstructured manner.

The term "Billboard Based Quad Rendering", as used herein, refers to a technique of rendering 2D textured quadrilateral elements in a 3D world.

The term "Volumetric Content", as used herein, refers to a video technique that captures a three-dimensional images. This type of videography acquires data that can be viewed on ordinary screens as well as 3D and VR devices. The viewer may experience the volumetric content in real-time.

The term "Virtual Camera", as used herein, refers to a computer-generated camera used to capture and present images in a virtual world. Virtual camera can capture and display objects or surroundings from multiple angles/distances as well as capture and display a user point of view (POV).

The term "Computer Generated Imagery (CGI)", as used herein, refers to the application of computer graphics to create virtualized images wherein images created using CGI can be in any field such as, for example, art, media, computer games, simulations and marketing etc. The CGI may be either dynamic or static and may be comprised from 2D, 3D or higher dimensional images.

The term "Reduced Latency Prediction Process", as used herein, refers to a process wherein probable image tiles are fetched and prepared to be presented to a user in accordance with a forecast based on calculating the likelihood that said tiles represent a future image of interest to said user. This process may result in reduced latency associated with image rendering.

The term "Extrapolated Output Dynamic Images", as used herein, refers to constant flow of images that comprise an extended visual data with regard to the captured input images forming the base upon said extrapolated output images are fetched and relayed.

The term "Multi-View Compression" (MVC or MVC 3D), as used herein, refers to a compression method which is based on the similarity of images acquired from various viewpoints of a scene by multiple video cameras. For example, dynamic images (such as, for example, stereoscopic 3D video) that are captured simultaneously using multiple cameras that captures images from various angles and creating a single video stream, may be compressed using this technology. According to some embodiments, free viewpoint dynamic images or multi-view 3D video may also be compressed using this technology which results in images being efficiently reduced in size and rendered along the rendering pipeline.

The term "Temporal Compression", as used herein, refers to compression of a sequence of image tiles along a timeline. For example, the temporal correlation that often exists between consecutive video frames and may display objects or image features moving from one location to another may be compressed using temporal tile compression in order to reduce overall size in bytes of the video frames as well as the time required for images to be rendered along the rendering pipeline.

Reference is made to FIG. 1, which constitutes a schematic perspective view of a dynamic images virtualization system 10 according to some embodiments of the invention. As shown, dynamic images virtualization system 10 comprises a controller 100 configured to execute a digital image processing and may control various devices forming the dynamic images virtualization system 10. According to some embodiments, at least one display means 200 is configured to display an extrapolated output dynamic images produced by the controller 100 to at least one user 20. According to some embodiments, controller 100 may be a separated device or may be integrated into or form a part of the display means 200. According to some embodiments, display means 200 comprises image capturing component 202 that can be, for example, a camera or any other kind of image capturing sensor.

According to some embodiments, display means 200 is a head-mounted display (HMD) configured to produce images to be perceived by the user 20 associated with it. According to some embodiments, display means 200 may be an off-the-shelf component such as, for example, a head mounted displays (HMD) of manufacturers such as HTC Oculus (e.g HTC Vive®, Oculus Rift®, Oculus Quest®, etc.), MagicLeap (e.g. MacigLeap One) or Microsoft (e.g. Hololens). According to some embodiments, display means 200 is an off-the shelf mobile cellular device, a laptop or a tablet configured to be held and viewed by the at least one user 20.

According to some embodiments, display means 200 may comprise various sensors 204, such as, for example, motion sensors, accelerometer, etc. and the data recorded by said sensors may be conveyed and relayed to the controller 100 for analysis.

According to some embodiments, both controller 100 and display means 200 comprise either wire or wireless communication means (not shown) enabling a constant data transfer from display means 200 to controller 100 and vice versa.

Figure 2:
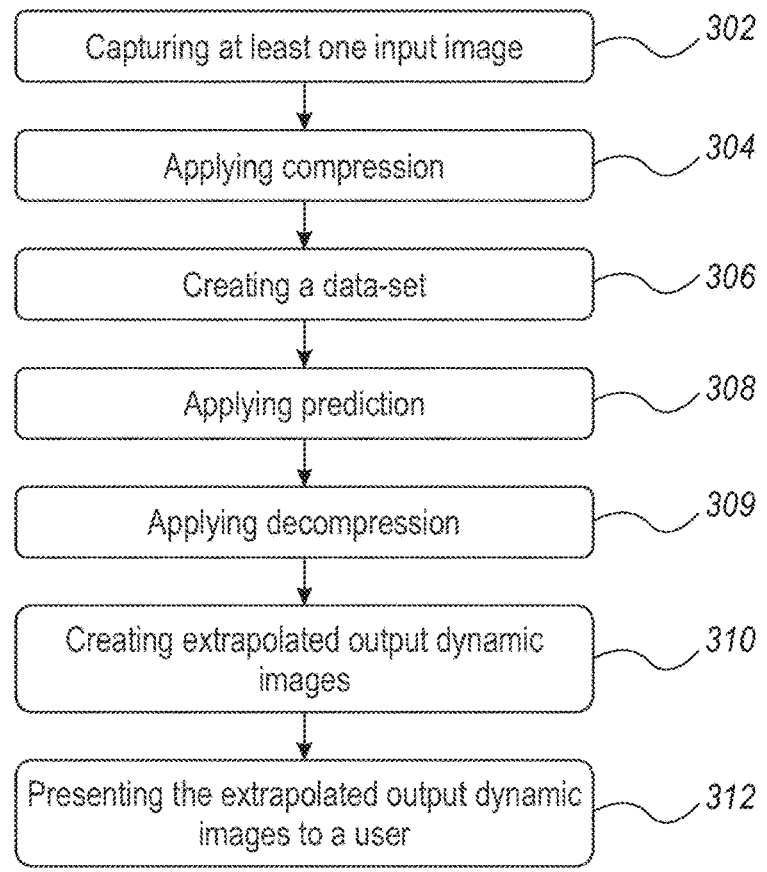
FIG. 2 constitutes a flowchart diagram illustrating a method for conducting a dynamic image virtualization using the dynamic image virtualization system, according to some embodiments of the invention.

Reference is made to FIG. 2 which constitutes a flowchart diagram illustrating a method for conducting a dynamic image virtualization using the dynamic image virtualization system 10, according to some embodiments of the invention. In operation 302, the method may include capturing at least one input image. According to some embodiments, input image/s may be captured by a hardware sensor that can be, for example, a camera, or alternatively, the input image/s may be captured by a virtual camera. According to some embodiments, the captured input image/s may be created using computer generated imagery (CGI). According to some embodiments, the captured input images are protected by authentication and verification algorithms to ensure exposure to an authorized user 20 only.

In operation 304, the method may include compressing the captured input image/s using various compression techniques and protocols. According to some embodiments, the captured input image/s is subdivided into independent tiles, which are then loaded into the rendering pipeline and in turn conveyed to user 20. According to some embodiments, the size of each tile is relatively reduced and requires shorter time to be transferred over the network.

According to some embodiments, the captured input images that are subdivided into independent tiles may be compressed to create 2D/3D output images comprising an unlimited stack of overlay layers and resolution pyramids. According to some embodiments, each image may include an array of compressed visual data such as, for example, color data (RGB), depth channel, transparency, motion vectors, normal maps, reflection/refraction, vectors etc.

According to some embodiments, each tile may be compressed using various tile compression techniques and protocols, such as, quantization of YUV, ETC or DXT. According to some embodiments, Image tile compression using the aforementioned techniques may help in minimizing the size in bytes of a graphics file without degrading the quality of said image to an unacceptable level. Image tile compression may also reduce the time required for images to be rendered along the rendering pipeline.

According to some embodiments, each tile may be compressed using multi-view compression MVC (also known as MVC 3D), which is based on the similarity of images acquired from various viewpoints, for example, images acquired from a moving scene that changes along a timeline or from a stationary scene captured from various angles. According to some embodiments, each tile may also be compressed using temporal compression of a sequence of image tiles along a timeline.

In operation 306, the method may include creating a data-set and its associated metadata. The metadata may contain an array of statically defined data-structures which define capturing and rendering properties such as, for example, data-structure of visual data, scale of the dataset in real-world unites, available levels of details, proxy objects, resolution, compression, streaming parameters, deep neural network (DNN) weights for current dataset, etc. According to some embodiments, Iterative process of rendering may start from the moment spatial relations between the virtual or hardware camera and the data-set orientation are defined.

According to some embodiments, the bearings of user 20 may be captured by sensors 204, such as, motion sensors, accelerometer, etc. and the captured data may be conveyed and relayed to the controller 100 for analysis. According to some embodiments, said bearings analysis may comprise part of the data-set created on operation 306 and may be used in the execution of the prediction disclosed hereinafter in operation 308.

In operation 308, the method may include applying prediction based on the data-set created in operation 306. According to some embodiments, the prediction operation 308 may improve user experience as well as the exploitation of system's resources by reducing the latency associated with a digital image processing.

According to some embodiments, the prediction process may apply a calculation regarding the likelihood that user 20 will be interested in viewing certain images' properties, such as, certain angles or viewpoints, a 3D reconstruction of the captured input image/s, a fly-over or navigation view, visual effects or any other visual aspect that can be predicted upon the captured input image/s.

According to some embodiments, the prediction operation 308 may be conducted using data fetching prediction process, for example, the prediction process may prefetch resources and predictable data even before the user 20 decide or made any kind of operation implying what he is interested in viewing next. According to some embodiments, the data fetching prediction process can be accomplished by training a model using artificial intelligence (AI), such as, artificial neural network (ANN) or deep neural network (DNN), etc. and suggest probable tiles in accordance to the AI model results.

The use of AI can reduce latency by applying machine-learning in order to accurately predict the user 20 preferences and provide him with a real-time output dynamic images. While suggesting probable tiles, the prediction operation 308 enables the creation of extrapolated output dynamic images that comprises more visual data than the captured input image\s (further disclosed in operation 310).

According to some embodiments, the data fetching prediction process can be conducted using content-delivery-network (CDN). The use of CDN may reduce latency by providing local cache from distributed servers and applying optimization processes regarding data rendering.

According to some embodiments, a quality enhancement of the extrapolated output dynamic images operation 312 may be conducted using quality enhancement process accomplished by training a model using artificial intelligence (AI) such as, for example, artificial neural network (ANN) or deep neural network (DNN) and by using techniques such as DeepPrior or other super resolution solutions based on DNN with or without the usage of Generative Adversarial Networks (GAN) in accordance to the AI model results.

The use of AI can enhance the output dynamic images quality that may have been reduced as a result of compression operation 304 or as a result of other operations disclosed in FIG. 2. According to some embodiments, applying machine-learning to a certain region of an image tile or to an entire image tile may fix or improve the overall visual quality of the output dynamic images presented to user 20.

According to some embodiments, the compression 304 and decompression 309 operations used to produce the extrapolated output dynamic image can be accomplished by training a model using artificial intelligence (AI) such as, for example, artificial neural network (ANN) or deep neural network (DNN).

The use of AI, ML, ANN or DNN during the phase of compression by applying machine-learning analysis to the entire dataset or it's parts may be used in order to compress or decompress tile data on the basis of common semantics identified during changing conditions. According to some embodiments, said semantics are obtainable by machine learning training in order to enable and operate a super resolution technique.

According to some embodiments, the prediction process may use the user 20 bearings' data gathered from sensors 204 and analyzed by controller 100 in order to present extrapolated output dynamic images in accordance with the position and movement of user 20, for example, a motion sensor may sense that a user 20 is turning its head in a certain direction, and relay said reading to controller 100 which in turn, according to said sensed movement, may apply a calculation regarding the likelihood that the user is headed to or interested in viewing images from that particular direction. According to some embodiments, a data fetching prediction process may then by applied and result in presenting user 20 with probable tiles forming a desired extrapolated output dynamic images showing, for example, said particular direction.

According to some embodiments, the prediction operation 308 may further use cache memory in order to provide a quick access data resource which in turn contributes in reducing latency. According to some embodiments, a replicated or distributed multi-tiers cache memory architecture that comprises multiple layers may be used in order to further improve computing efficiency and reduce latency associated with a digital image processing.

In operation 309 a decompression process may apply in order to restore compressed image/s tiles and extract encrypted data. According to some embodiments, the compression 304 and decompression 309 operations of tiles used to produce the extrapolated output dynamic image can be accomplished by training a model using artificial intelligence (AI) such as, for example, artificial neural network (ANN) or deep neural network (DNN).

In operation 310, the method may include creating extrapolated output dynamic images that comprise more visual data than the input image/s captured on operation 302. According to some embodiments, the extrapolated output dynamic images are created in real-time, meaning, the user 20 experiences a constant dynamic sensation of movement in an environment, or constant dynamic sensation of viewing object\s from different perspectives. For example, user 20 may experience a real-time sensation of observing a commercial product in various angles\viewpoints\distances, alternatively, the user 20 may experience in real-time, a sensation of movement in a certain architectural structure or any kind of surroundings.

According to some embodiments, the reduced-latency prediction operation 308 enables the creation of extrapolated output dynamic images in operation 310 by predicting and suggesting subsequent probable tiles. According to some embodiments, a probable tile may be an image or a part of an image that the user is probably interested in seeing at the near future, such tile can be, for example, an image or a part of an image of another angle or view-point of an object or surroundings.

According to some embodiments, tile rendering process is applied in order to reduce the amount of memory and system resources needed to produce the extrapolated output dynamic images.

According to some embodiments, each tile may include an array of classified visual data that may contribute to an optimized efficiency in data locating and as a consequence, may contribute in reducing latency. According to some embodiments, the array of classified visual data forming each tile is compressed using various compression protocols in order to save processing resources. According to some embodiments, each tile is a multi-resolution tile.

According to some embodiments, the captured input image/s is a 2D image/s that, after going through operations 302-309, is converted in operation 310 into 3D extrapolated output dynamic images that are presented to user 20. According to some embodiments, the captured input image/s is a 3D image/s that, after going through operations 302-309, is converted in operation 310 into 2D extrapolated output dynamic images that are presented to user 20.

According to some embodiments, the extrapolated output dynamic images may display at least one virtualized visual effect. Such visual effect can be, for example, a virtual character used for presentation or any other purpose.

Another possible implementation of a visual effect is applying a visual effect upon a real object or surrounding captured in an input image/s, for example, a real object can be decorated with virtualized visual effects such as smoke, sparkling light, accessories or any other visual effect according to changing need and desires of the user 20 or the operators of the dynamic images virtualization system 10.

According to some embodiments, each dynamic output image/s comprises a pyramid of resolutions produced by one of the following ways: Scalable video coding (SVC), Laplacian pyramid or any other multi-resolution approach.

In operation 312, the method may include presenting the extrapolated output dynamic images to a user 20. According to some embodiments, the extrapolated output dynamic images are presented to the user 20 by using a view-dependent reconstruction of a virtual camera, for example, the system may present the extrapolated output dynamic images to a user 20 from his own point of view, meaning the user 20 may view the extrapolated output dynamic images as if he is observing it using his own eyes.

According to some embodiments, the extrapolated output dynamic images are presented as a view-dependent reconstruction of a virtual camera allowing users 20 to freely change the camera's perspective in a virtual world and observe an object or environment from different angels, distances etc.

According to some embodiments, the extrapolated output dynamic images are presented using unstructured light-field technology using projectors that may be used in order to capture light rays from various directions. According to some embodiments, image capturing means 202 may be configured to capture light-field images with no need for external projectors. According to some embodiments, the extrapolated output dynamic images are presented using billboard based quad rendering.

According to some embodiments, a free navigation mode may allow the user 20 to move a desired view point from one location to another, giving the impression that the camera is physically moving from one point to another. In yet another example, a fly-over perspective view may be achieved by providing an unlimited multiple upper viewpoint of certain object or surroundings. According to some embodiments, the aforementioned examples and many more may be achieved in real-time while user 20 experiences minimal latency by creating an extrapolated output dynamic images that comprise more visual data than the originally captured input image/s as disclosed in operation 310.

According to some embodiments, a remote streaming process is used to convey the input images created on operation 306 wherein said remote streaming can be performed using any known streaming protocol. According to some embodiments, the digital image processing performed by the controller 100 may include streaming of an object-centric volumetric content and present it to user 20 wherein the presented object can be any physical or virtual object. According to some embodiments, the digital image processing performed by controller 100 may apply streaming of a view-centric volumetric content presented to user 20 wherein the presented view can be any environment or surroundings, either outdoor or indoor, realistic or stylized, such as an architectural structure, landscape etc.

According to some embodiments, the streaming of input images can be relayed by either wire or wireless communication in accordance with various needs or constraints.

Figure 3:
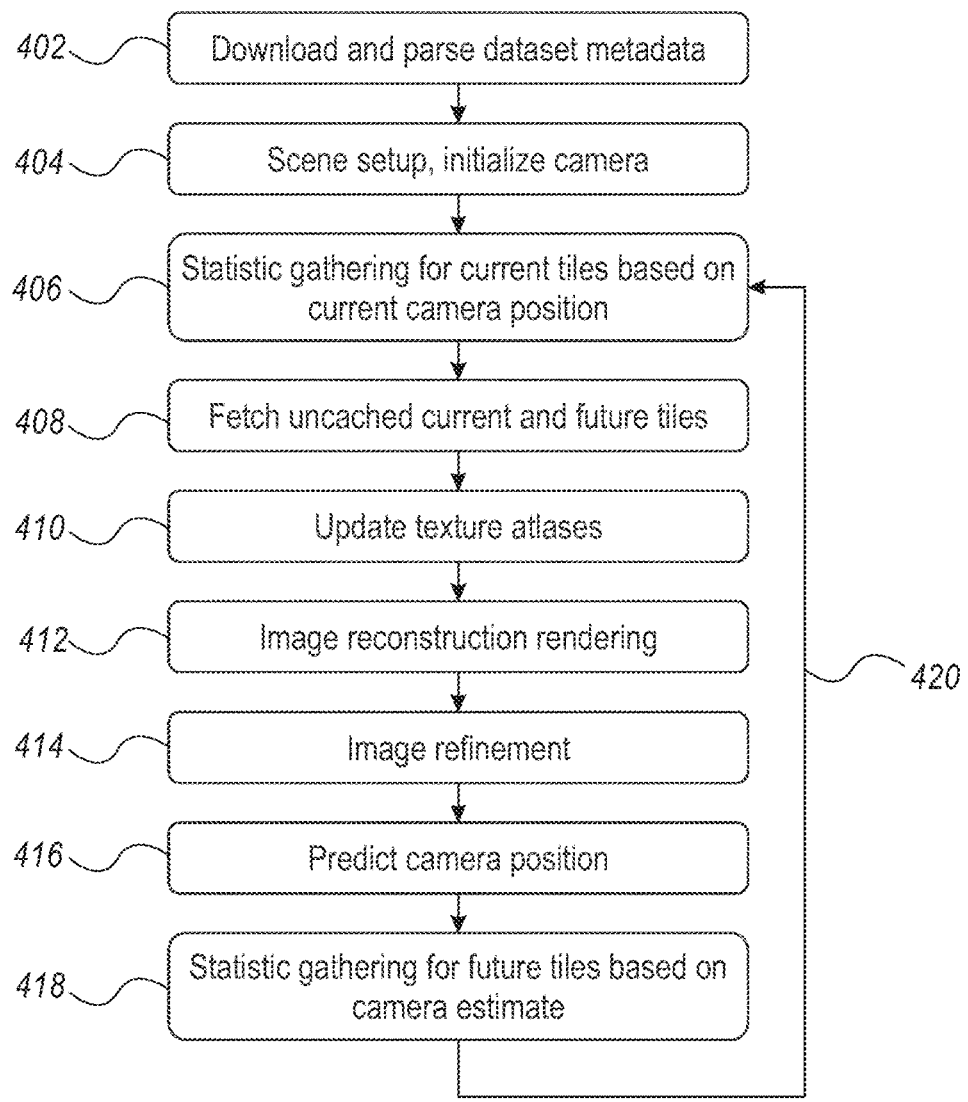
FIG. 3 constitutes a flowchart diagram illustrating possible sub-operations previously disclosed in FIG. 2, according to some embodiments of the invention.

Reference is made to FIG. 3 which constitutes a flowchart diagram illustrating possible sub-operations of operations 306-312 previously disclosed in FIG. 2 from an algorithmic point of view, according to some embodiments of the invention. In operation 402 the method may include downloading and parse the metadata created on operation 306 disclosed in FIG. 2. In operation 404 the method may include the setup of the visual scene that will be presented to user 20 through a reconstruction of a virtual camera as previously disclosed in operations 310-312 of FIG. 2.

According to some embodiments, the visual scene may also be presented to user 20 through a hardware camera that captures a physical representation of an actual scene or object. In operation 406 the method may include gathering statistics and other valuable data in order to present user 20 with tiles that represent the current position of the virtual or hardware camera. In operation 408 the method may include extracting from the cache memory, current and future subsequent probable tiles to be fetched and presented to user 20 as part of the prediction process 308 previously disclosed in FIG. 2. In operation 410 the method may include updating the texture atlases in accordance with extracted data disclosed in operation 408. In operation 412 the method may include the construction of extrapolated output dynamic images previously disclosed in operation 310 of FIG. 2.

According to some embodiments, the extrapolated output dynamic images constructed in operation 412 may be 2D or 3D images. In operation 414 the method may include applying any sort of image refinement filter, technique or protocol in order to improve the extrapolated output dynamic images presented to user 20. In operation 416 the method may include a prediction of future positions of the virtual or hardware camera using the prediction stages and techniques previously disclosed in operation 308 of FIG. 2. In operation 418 the method may include gathering statistics and valuable data regarding the fetching and presentation of future predictable tiles based on an estimation of future camera positions.

According to some embodiments, such future predictable tiles may be an image or part of an image of a view/object-dependent or virtual/hardware camera that reflects the point of view of user 20. According to some embodiments, the statistics and other valuable data gathered in operation 418 may be relayed using feedback loop 420 in order provide feedback to the statistic gathering operation 406.

Figure 4:
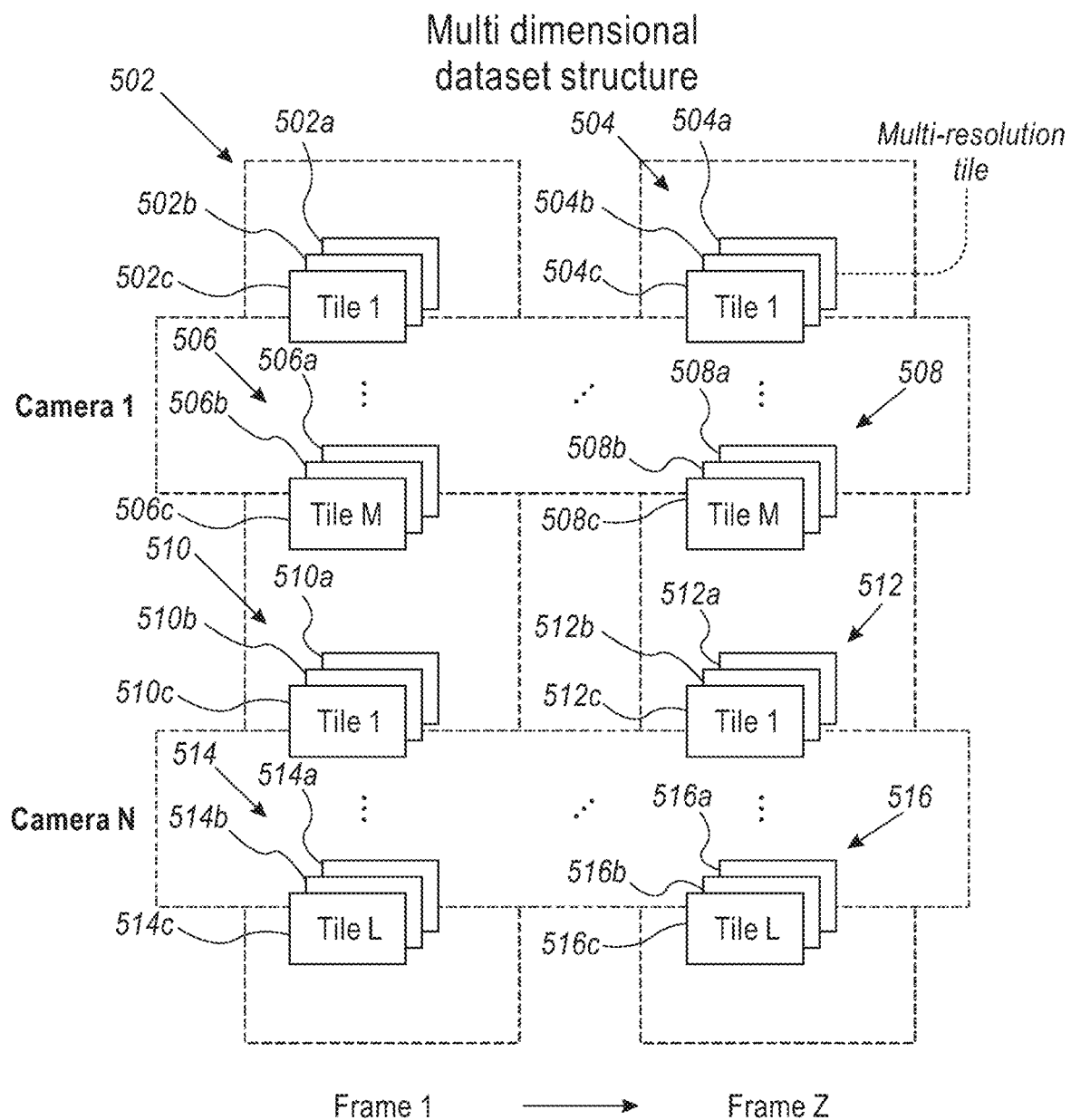
FIG. 4 constitutes a structure diagram illustrating various sub-operations of data-set structure of the various compression methods used during the operation of a dynamic images virtualization system, according to some embodiments of the invention.

Reference is made to FIG. 4 which constitutes a structure diagram illustrating various sub-operations of data-set structure of the various compression and packaging methods which contribute to a reduced latency and used during the operation of the dynamic images virtualization system 10, according to some embodiments of the invention. A plurality of cameras, (for example, camera 1 to camera N) are configured to capture images that will eventually be presented as part of a frame sequence (for example, frames 1 to Z) along a timeline. According to some embodiments, said plurality of cameras can be either hardware of virtual cameras. According to some embodiments, each captured image is subdivided into independent tiles, for example, tiles 502a to 516c that can be later combined to form a larger image.

According to some embodiments, few compression techniques may be applied upon said tiles, as disclosed below:

a.) According to some embodiments, each captured image that has been subdivided into independent tiles can be restored by compressing said tiles in order to create output images comprising an unlimited stack of overlay layers and resolution pyramids, for example, tile 502a that may be a 10*10 pixel tile and tile 502b that may be 50*50 pixel tile may be compressed in order to eventually form an output image comprised from said tiles.

According to some embodiments, each tile 502*a* to 516*c* may further include an array of compressed visual data such as, for example, color data (RGB), depth bitmap, alpha transparency bitmap, motion vectors, normal maps, reflection/refraction bitmapetc. According to some embodiments, each tile 502*a* to 516*c* may be combined with other tiles to create a larger tile comprising visual data derived from several individual tiles. According to some embodiments, in order to reduce the amount of data being rendered, the tiles may comprise only low frequency data while an algorithm may be used to complete and compensate missing visual data and by that restoring the actual capture image.

b.) According to some embodiments, each tile 502*a* to 516*c* may be compressed using temporal compression, for example, tiles comprising a dynamic images sequence along a timeline such as the temporal correlation that exists between consecutive video frames and display objects or image features moving from one location to another, may be compressed using temporal tile compression in order to reduce their size in bytes as well as the time required for images to be rendered along the rendering pipeline.

c.) According to some embodiments, multi view compression (MVC or MVC 3D) may be applied by using multiple cameras 1 to N to simultaneously acquire various viewpoints of a scene. For example, tiles created by subdividing the input dynamic images captured simultaneously from various angles using multiple cameras 1 to N, may be compressed using this technology to create a single dynamic images stream. Due to the extensive raw bit rate of multi-view video, efficient compression techniques are essential in order that images will be efficiently rendered along the rendering pipeline. According to some embodiments, MVC compression may be conducted using artificial intelligence (AI) such as, for example, deep neural network (DNN) or any other AI model.

According to some embodiments, tiles subdivided from captured free viewpoint dynamic images or from multi-view 3D video may also be compressed using this technology. According to some embodiments, the aforementioned compression techniques may be combined with each other to achieve a greater extent of data compression.

Figure 5:
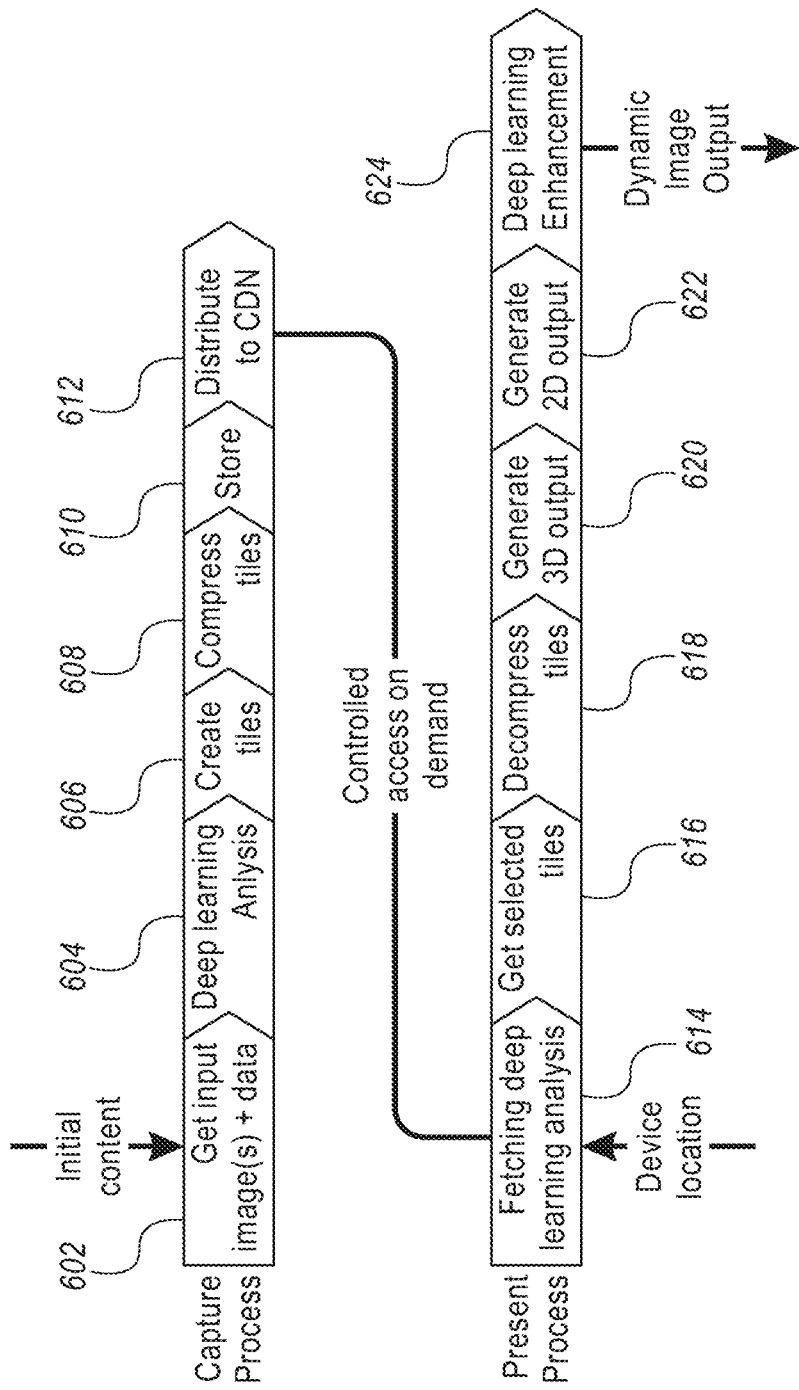
FIG. 5 constitutes a flowchart diagram illustrating possible further sub-operations partly disclosed in FIG. 2 and FIG. 3, according to some embodiments of the invention.

Reference is made to FIG. 5 which constitutes a flowchart diagram illustrating possible sub-operations of operations 302-312 previously disclosed in FIG. 2, according to some embodiments of the invention. In operation 602 the method may include acquiring input image/s captured by a camera, that can be, for example, a hardware camera or a virtual camera. According to some embodiments, the captured input image/s may also be created using computer generated imagery (CGI). According to some embodiments, during operation, 602 further data may be acquired, for example, a real-time monitoring of a user's 20 bearings.

In operations 604 and 606 the acquired input image/s may be processed and analyzed by artificial intelligence (AI) such as, for example, deep neural network (DNN) in order to, according to some embodiments, subdivide said input image/s into multiple image tiles. According to some embodiments, said tiles may exhibit different resolutions and have different sizes, for example, a tile may be a 10*10 pixel, 50*50 pixel and so on and be in various sizes, from a few kilobytes to a few gigabytes.

In operation 608 the tiles produced in operation 606 may be compressed using various compression techniques and protocols. According to some embodiments, the size of each compressed tile is relatively reduced such that each tile requires a modest amount of computing resources to be rendered along the rendering pipeline. Said compression techniques may include pyramids of resolutions, temporal compression or multi view compression as detailed above. According to some embodiments, the aforementioned compression techniques may be combined to achieve a greater extent of data compression (As further detailed in the description of FIG. 4).

In operation 610 the compressed tiles may be stored, for example, in an available physical memory or in a remote server as part of cloud computing network. In operation 612 the compressed tiles may be distributed to a content delivery network (CDN). According to some embodiments, the use of CDN may reduce latency by providing local cache from distributed servers and applying optimization processes regarding data rendering. According to some embodiments, security measures, such as, a controlled access on demand process may be used in order to regulate the rendering of the compressed tiles to undergo operation 614. According to some embodiments, said compressed tiles may be protected by a verification algorithm to ensure exposure to an authorized user 20 only.

In operation 614 artificial intelligence (AI) such as, for example, deep neural network (DNN) may be applied in order to execute fetching prediction process that may prefetch resources and predictable data in order to create selected further tiles of operation 616. According to some embodiments, said fetching prediction process may be used to create extrapolated output dynamic Image/s that comprises an extended visual data with regard to the input images captured in operation 602. According to some embodiments, said fetching prediction process enables probable image tiles to be fetched and prepared to be presented to a user in accordance with a forecast based on calculating the likelihood that said tiles represent a future image that user 20 has interest in.

According to some embodiments, said fetching prediction process may result in reduced latency associated with image rendering. According to some embodiments, the device location and bearings may have an influence on said fetching prediction process. According to some embodiments, sensors, such as, for example, motion sensors, accelerometer, etc. may record the bearings of user 20 and said bearings analysis may be used in the execution of the said fetching prediction process.

In operation 618 a decompression process may apply in order to restore compressed tiles and extract encrypted data. In operation 620 3D dynamic images may be created from said decompressed tiles. In operation 622 said 3D dynamic images are processed to a 2D dynamic images. In operation 624 quality enhancement process may be accomplished in order to produce output dynamic images by training a model using artificial intelligence (AI) such as, for example, artificial neural network (ANN) or deep neural network (DNN) and in accordance to the AI model results. According to some embodiments, said quality enhancement process performed by a super resolution algorithm.

According to some embodiments and as mentioned above, quality enhancement of the extrapolated output dynamic images produced as a result of the methods described in FIG. 2 and FIG. 5 may be conducted using a quality enhancement process accomplished by training a model using artificial intelligence (AI) such as, for example, artificial neural network (ANN) or deep neural network (DNN) and in accordance to the AI model results.

According to some embodiments, the use of AI can enhance quality by applying various technologies upon the output dynamic images produced as a result of the methods described in FIG. 2 and FIG. 5. For example, Super Resolution or SR may be used for upscaling and/or improving the details of said output dynamic images. According to some embodiments, a low-resolution output dynamic images may be upscaled to a higher resolution using said AI model wherein the further details in the high-resolution output dynamic images are filled in where the details are essentially unknown. According to some embodiments, a mathematical function takes a low-resolution image that lacks details and apply a prediction of the missing details/features in said image, and by doing so, the mathematical function may produce details that potentially never recorded in the original input image, but nevertheless may serve in enhancing the image quality.

According to some embodiments, an image repair technique such as inpainting may be executed upon the output dynamic images produced as a result of the methods described in FIG. 2 and FIG. 5 in order to repair image defects by retouching to remove unwanted elements. According to some embodiments, training an inpainting AI model can be executed by cutting out sections of an image and train the AI model to replace the missing parts based on prior knowledge and a prediction process.

Although the present invention has been described with reference to specific embodiments, this description is not meant to be construed in a limited sense. Various modifications of the disclosed embodiments, as well as alternative embodiments of the invention will become apparent to persons skilled in the art upon reference to the description of the invention. It is, therefore, contemplated that the appended claims will cover such modifications that fall within the scope of the invention.

The invention claimed is:

1. A dynamic images virtualization system, comprising:
(i) a controller configured to perform digital image processing by using an AI model trained to perform data fetching prediction upon at least one input image generated by a static 2D computer generated imagery (CGI) and to create extrapolated output dynamic images that contain more visual data than the at least one input image generated by the static 2D CGI, the data fetching prediction by the AI model extracting a tile from a cache memory before detection of any indication of user viewing interest; and
(ii) at least one display means configured to present the extrapolated output dynamic images to at least one user, the extrapolated output dynamic images containing more visual data than the at least one input image by including the tile extracted by the AI model from the cache memory before detection of any indication of user viewing interest,
wherein the at least one input image is generated offline by the static 2D CGI prior to the data fetching prediction and the extrapolated output dynamic images are free viewpoint 3D images and wherein the data fetching prediction has a reduced-latency and results in production of the extrapolated output dynamic images that comprise novel images as well as novel multi-directional and image scenery parameters in comparison with the at least one input image generated offline by the static 2D CGI prior to the data fetching prediction.

2. The system of claim 1, wherein the at least one input image is subdivided into multiple image tiles.

3. The system of claim 1, wherein the reduced latency data fetching prediction uses a content-delivery-network (CDN) by extracting the tile from a local cache provided by the CDN.

4. The system of claim 1, wherein the reduced latency data fetching prediction produces the extrapolated output dynamic images by calculating and generating subsequent future tiles that are based on the at least one input image.

5. The system of claim 4, wherein each tile of the subsequent future tiles includes an array of visual data.

6. The system of claim 5, wherein the array of visual data of each tile is compressed.

7. The system of claim 4, wherein each tile is a multi-resolution tile.

8. The system of claim 4, wherein each tile is a multi-view compressed tile.

9. The system of claim 4, wherein each tile is temporally compressed.

10. The system of claim 4, wherein each tile of the subsequent future tiles is combined with at least one other tile to create a larger tile comprising visual data of the combined tiles.

11. The system of claim 4, wherein the extrapolated output dynamic images comprise an unrestricted stack of overlay layers and resolution pyramids.

12. The system of claim 1, wherein the extrapolated output dynamic images provide an input to the AI model that was trained to conduct image quality enhancement using a deep neural network (DNN).

13. The system of claim 1, wherein further image quality enhancement is performed upon the extrapolated output dynamic images using a super resolution (SP) technique.

14. The system of claim 1, wherein the digital image processing performs streaming of object-centric volumetric content presented to the at least one user using the at least one display means.

15. The system of claim 1, wherein the digital image processing performs streaming of view-centric volumetric content presented to the at least one user using the at least one display means.

16. The system of claim 1, wherein the extrapolated output dynamic images are presented using unstructured light-field technology.

17. The system of claim 1, wherein the extrapolated output dynamic images are presented using billboard based quad rendering.

18. The system of claim 1, wherein the at least one input image is created and then displayed as extrapolated output dynamic images by using a view-dependent reconstruction of a virtual camera.

19. The system of claim 1, wherein the extrapolated output dynamic images display at least one of a virtualized architectural space or a virtualized architectural structure.

20. The system of claim 1, wherein the extrapolated output dynamic images display at least one virtualized visual effect.

* * * * *